United States Patent Office 3,365,474
Patented Jan. 23, 1968

3,365,474
POLYHYDROXYPREGN-7-ENES AND PROCESSES FOR THEIR PREPARATION
John H. Fried, Palo Alto, Calif., assignor to Syntex Corporation, Panama, Panama, a corporation of Panama
No Drawing. Filed July 22, 1966, Ser. No. 567,042
10 Claims. (Cl. 260—397.4)

The present invention relates to novel steroids and to processes for their preparation.

In particular, this invention pertains to polyhydroxypregn-7-enes and to methods for preparing the same.

The compounds of the present invention may be represented by the following formula:

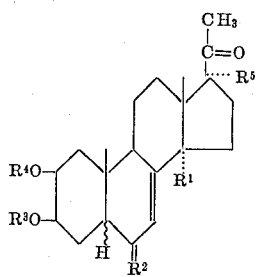

wherein $R^1$ is hydrogen or hydroxy;
$R^2$ is oxo or (hydrogen or hydroxy);
each of $R^3$ and $R^4$ is hydrogen, or taken together the group

in which each of A and B is hydrogen or lower alkyl of up to 6 carbon atoms; and
$R^5$ is hydrogen, hydroxy or acyloxy The wavy "$\smallsmile$" denotes the $\alpha$ and $\beta$ configuration, both singularly and collectively, and both such configurations are included for compounds so indicated. With respect to the hydroxy group in the 6-position, this may be either $\alpha$ or $\beta$, or a mixture of the two isomers may be employed.

The foregoing compounds are useful in promoting growth in animal species. Moreover, these compounds are antagonistic to the action of certain naturally occurring hormones, such as the insect hormone ecdysone, and can be used to effect a disruption in the normal metamorphic development of insect population. These compounds also exhibit progestational properties.

The compounds of the present invention are prepared from a 22-keto steroid via the action of oxygen in base. For example, a 24-norchol-7-en-22-one of Formula II is first treated with oxygen in the presence of a base such as potassium t-butoxide to yield the 20-hydroperoxide intermediate (Formula III). This intermediate need not be isolated and the basic reaction medium need only be flushed of oxygen, as with nitrogen, and briefly warmed to cause generation of the desired 20-ketopregn-7-ene (Formula IV).

Treatment of this 20-ketopregn-7-ene thus obtained with manganese dioxide or, alternatively, with 2,3-dichloro-5,6 - dicyanobenzoquinone then selectively forms the corresponding 6-keto compound (Formula V).

If desired, the 2$\beta$,3$\beta$-alkylidenedioxy function is hydrolyzed with a proton donor such as p-toluenesulfonic acid or hydrochloric acid to yield the corresponding 2$\beta$,3$\beta$-diol (Formula VI).

These reactions may be represented as follows:

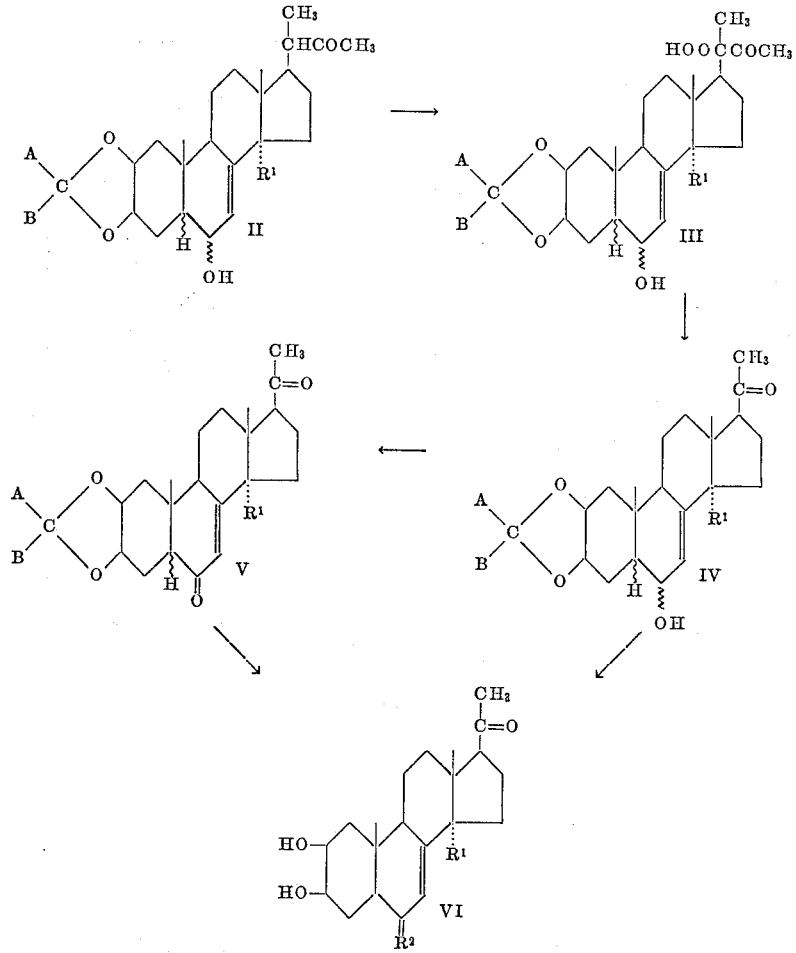

The preparation of 17α-hydroxy compounds and acylates thereof is accomplished by initial treatment of a compound of Formula IV wherein $R^1$ is hydrogen with oxygen in the presence of base to form the 17α-hydroperoxide. This is then reduced to the corresponding 17α-hydroxy compound with zinc and acetic acid and the 6,17α-dihydroxy compound is next converted to 6-keto-17α-hydroxy derivative with manganese dioxide in the manner previously described. Acylation of the 17α-hydroxy group, when desired is next accomplished via briefly refluxing, as for about 5 minutes, the steroidal alcohol in the appropriate anhydride in the presence of an acid catalyst such as p-toluenesulfonic acid. A 14α-hydroxy group is next introduced, when desired, by treatment with selenium dioxide and the 2β,3β-alkylidenedioxy group is then cleaved as previously described. Those reactions may be represented as follows:

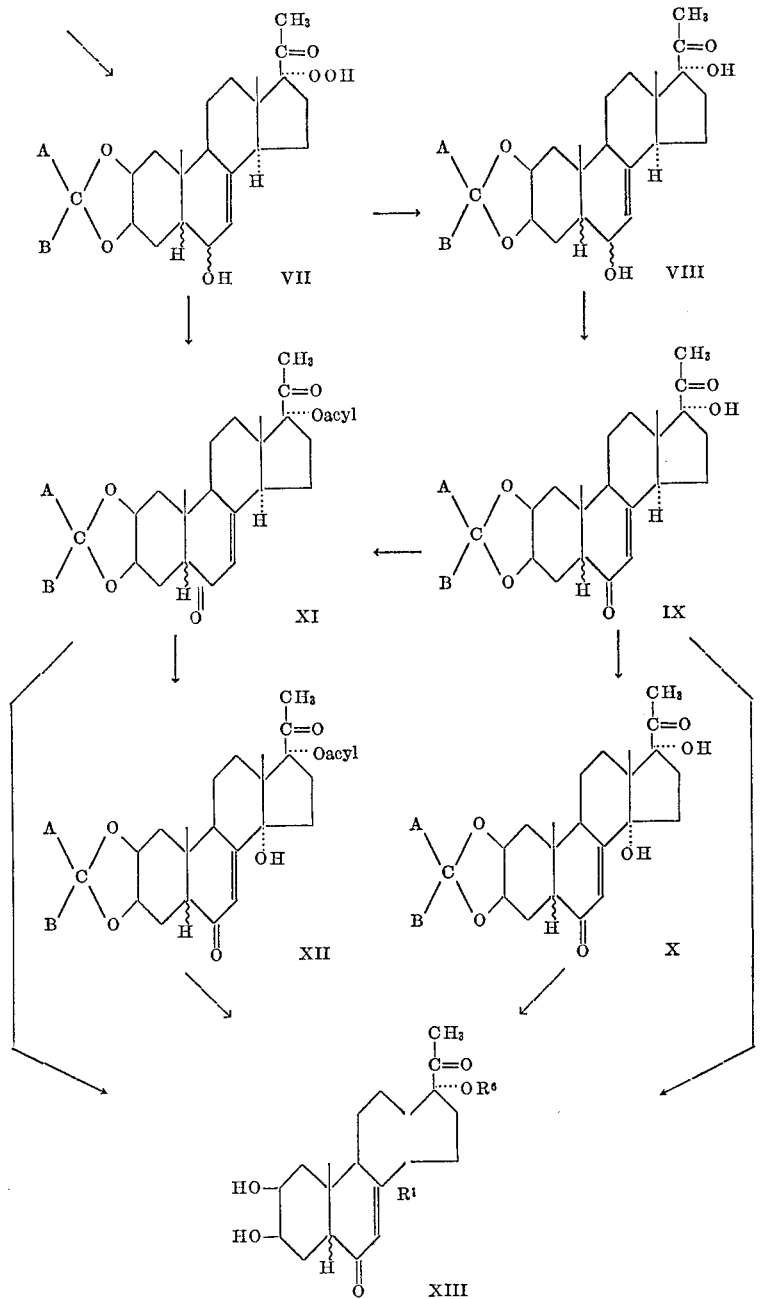

In the foregoing, $R^6$ is hydrogen or acyl.

Requisite intermediates of Formula II may be obtained according to the procedures of copending application Serial No. 553,041, filed May 26, 1966. Briefly, this method involves treatment of a 22,23-bisnorchol-7-enoic alkyl ester with dimethylsulfoxide (or other dialkylsulfoxides) under basic conditions to yield the corresponding 23 - methylsulfinyl - 24-norchol-7-en-22-one. Subsequent treatment with aluminum amalgam effects reductive desulfinylation with generation of the desired starting 24-norchol-7-en-22-one of Formula II.

The following examples will serve to further typify the nature of this invention, but as these are presented for the purpose of illustration, they should not be construed as a limitation on the scope of this invention.

*Example 1*

One gram of 2β,3β - isopropylidenedioxy-6,14α-dihydroxy-24-nor-5β-chol-7-en-22-one (obtained as described in copending application Ser. No. 553,041, filed May 26, 1966) is dissolved in 20 ml. of t-butanol and 20 ml. of dioxane containing 2.2 g. of potassium t-butoxide. Oxygen is introduced to the mixture at 5° C. to 7° C. until one equivalent has been consumed, and the mixture is then flushed with nitrogen and heated, also under nitrogen, at from about 40° C. to about 60° C. for 20 minutes. The mixture is then poured into water and extracted with ethyl acetate. These extracts are dried over sodium sulfate and evaporated to give 2β,3β-isopropylidenedioxy-6,14α-dihydroxy-5β-pregn-7-en-20-one, which may be further purified through chromatography on silica.

In a similar fashion, there are obtained according to the foregoing procedure and from the appropriate starting materials: 2β,3β-isopropylidenedioxy-6,14α-dihydroxy-5α-pregn-7-en-20-one; 2β,3β-isopropylidenedioxy-6-hydroxy-5β - pregn-7-en-20-one; and 2β,3β-isopropylidenedioxy-6-hydroxy-5α-pregn-7-en-20-one.

*Example 2*

One gram of 2β,3β - isopropylidenedioxy - 6,14α - dihydroxy - 5β - pregn-7-en-20-one in 100 ml. of chloroform, which has been distilled over calcium chloride, is stirred for 18 hours at room temperature with 10 g. of freshly precipitated manganese dioxide. The inorganic material is then removed by filtration and washed with hot chloroform, and the combined filtrate and washings are evaporated to yield 2β,3β - isopropylidenedioxy-14α-hydroxy-5β-pregn-7-ene-6,20-dione, which may be further purified through recrystallization from acetone:hexane.

Alternatively, the following procedure is employed.

A mixture of 1 g. of 2β,3β - isopropylidenedioxy-6,14α - dihydroxy - 5α - pregn-7-en-20-one in 20 ml. of dioxane and 1.1 molar equivalents of 2,3 - dichloro-5,6-dicyano-1,4-benzoquinone is allowed to stand at room temperature for 3 hours. The solid formed during the reaction is removed by filtration and the filtrate is evaporated to dryness. The residue is dissolved in acetone and filtered through 20 g. of alumina to yield 2β,3β-ispropylidenedioxy-14α - hydroxy - 5α - pregn-7-ene-6,20-dione, which may be further purified by recrystallization from acetone:hexane.

In a similar fashion, 2β,3β - isopropylidenedioxy-5β-pregn - 7 - ene - 6,20-dione and 2β,3β - isopropylidenedioxy-5α-pregn-7-ene-6,20-dione are obtained.

*Example 3*

One gram of 2β,3β - isopropylidenedioxy - 14α-hydroxy - 5β-pregn-7-ene-6,20-dione is dissolved in 90 ml. of 80% aqueous tetrahydrofuran and 90 ml. of 1 N hydrochloric acid and is allowed to stand for about 3 hours. At the end of this time, the mixture is washed to neutrality with aqueous sodium bicarbonate and is extracted with ethyl acetate. These extracts are washed with water, dried over sodium sulfate and evaporated to dryness to yield 2β,3β,14α - trihydroxy - 5β - pregn - 7 - ene-6,20-dione, which may be further purified through chromatography on silica gel.

In a similar fashion, the following compounds are obtained:

2β,3β,14α-trihydroxy-5α-pregn-7-ene-6,20-dione;
2β,3β-dihydroxy-5β-pregn-7-ene-6,20-dione;
2β,3β-dihydroxy-5α-pregn-7-ene-6,20-dione;
2β,3β,6,14α-tetrahydroxy-5β-pregn-7-en-20-one;
2β,3β,6,14α-tetrahydroxy-5α-pregn-7-en-20-one;
2β,3β,6-trihydroxy-5β-pregn-7-en-20-one; and
2β,3β,6-trihydroxy-5α-pregn-7-en-20-one.

*Example 4*

To a solution of 500 mg. of 2β,3β - isopropylidene-6 - hydroxy - 5β - pregn-7-en-20-one in 5 ml. of tetrahydrofuran is added a solution of 1 N potassium-t-butoxide in 15 ml. of t-butanol and the resulting solution is shaken at 0° C. under an atmosphere of oxygen. After about 15 minutes, the shaking is discontinued and the solution is neutralized to pH 7 with 1 N acetic acid and extracted with ethyl acetate. The extracted organic layer is washed with water, dried over sodium sulfate, and evaporated at 30° C. to yield the 17α-hydroperoxide which may be crystallized from an acetone-water.

A solution of 3.1 g. of this hydroperoxide in 100 ml. of acetic acid is stirred with 6 g. of zinc dust at 25° C. for 12 hours. The mixture is then filtered and the residue washed with ether. The combined filtrate and washings are diluted with ether, washed first with water and then with a saturated sodium bicarbonate solution, dried over sodium sulfate, and evaporated to dryness. The residue is chromatographed on silica gel, eluting with chloroform: methanol (9:1) to yield 2β,3β - isopropylidene - 6,17α-dihydroxy - 5β-pregn-7-en-20-one which may be further purified upon crystallization from acetone:hexane.

One gram of 2β,3β - isopropylidene - 6,17α-dihydroxy-5β - pregn-7-en-20-one in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield 2β,3β - isopropylidenedioxy - 17α-hydroxy - 5β - pregn-7-ene-6,20-dione which may be further purified through recrystallization from acetone:hexane.

A mixture of 1 g. of 2β,3β - isopropylidenedioxy - 17α-hydroxy - 5β - pregn-7-ene-6,20-dione, 50 ml. of acetic acid, 25 ml. of acetic anhydride, and 0.5 g. of p-toluenesulfonic acid is allowed to stand at R.T. for 1 hr. The mixture is then quenched in ice-water and extracted with methylene chloride. These extracts are washed with water, dried over sodium sulfate and evaporated to dryness. The residue is chromatographed on alumina gel to yield 2β,3β-isopropylidenedioxy - 17α-acetoxy - 5β-pregn-7-ene-6,20-dione.

A mixture of 140 mg. of selenium dioxide, 10 ml. of dry dioxane and 265 mg. of 2β,3β - isopropylidenedioxy-17α - acetoxy - 5β - pregn-7-ene-6,20-dione is refluxed for four hours. The reaction mixture is then cooled and filtered. The filtrate is washed with dilute aqueous potassium bicarbonate and extracted with methylene chloride. These extracts are washed with saturated sodium chloride solution, dried and filtered through diatomaceous earth. Concentration of the filtrate yelds 2β,3β - ispropylidenedioxy - 14α - hydroxy - 17α - acetoxy-5β-pregn-7-ene-6,20-dione.

In a similar fashion, there is obtained from 2β,3β-isopropylidenedioxy - 17α - hydroxy - 5β - pregn-7-ene-6,20-dione via the use of selenium dioxide, 2β.3β-isopropylidenedioxy - 14α,17α - dihydroxy - 5β-pregn-7-ene-6,20-dione.

Treatment of 2β,3β - isopropylidenedioxy - 14α-hydroxy - 17α - acetoxy - 5β - pregn-7-ene-6,20-dione with acid as described in Example 3 yields 2β,3β,14α-trihydroxy-17α-acetoxy-5β-pregn-7-ene-6,20-dione.

In a similar fashion, there is obtained 2β,3β-dihydroxy-17α - acetoxy - 5β - pregn - 7 - ene-6,20-dione; 2β,3β,14α, 17α - tetrahydroxy - 5β - pregn - 7-ene-6,20-dione; and 2β3β,17α-trihydroxy-5β-pregn-7-ene-6,20-dione.

What is claimed is:
1. Compounds of the formula:

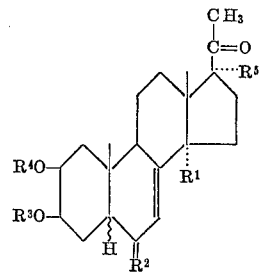

wherein
$R^1$ is hydrogen or hydroxy;
$R^2$ is oxo or (hydrogen or hydroxy);

each of $R^3$ and $R^4$ is hydrogen, or taken together the group

in which each of A and B is hydrogen or lower alkyl; and $R^5$ is hydrogen, hydroxy or acyloxy.

2. Compounds according to claim 1 wherein each of $R^3$ and $R^4$ are hydrogen, $R^1$, $R^2$, and $R^5$ are as therein defined and the hydrogen atom in the 6-position is in the β-configuration.

3. The compound according to claim 2 wherein $R^1$ is hydroxy, $R^2$ is oxo, $R^5$ is hydrogen.

4. The compound according to claim 2 wherein $R^1$ is hydrogen, $R^2$ is oxo, and $R^5$ is hydrogen.

5. The compound according to claim 2 wherein $R^1$ is hydroxy, $R^2$ is oxo, and $R^5$ is hydroxy.

6. The compound according to claim 2 wherein $R^1$ is hydrogen, $R^2$ is oxo, and $R^5$ is hydroxy.

7. Compounds according to claim 2 wherein $R^1$ is hydroxy, $R^2$ is oxo, and $R^5$ is acyloxy.

8. The compound according to claim 7 wherein $R^5$ is acetoxy.

9. Compounds according to claim 2 wherein $R^1$ is hydrogen, $R^2$ is oxo, and $R^5$ is acyloxy.

10. The compound according to claim 9 wherein $R^5$ is acetoxy.

References Cited

Karlson et al.: Chemische Berichte, July 1965, pages 2394–2402.

ELBERT L. ROBERTS, *Primary Examiner.*